March 24, 1953     M. E. BALCOM     2,632,656
TAKE-UP DEVICE FOR AUTOMOBILE STEERING IDLERS
Filed Feb. 19, 1951
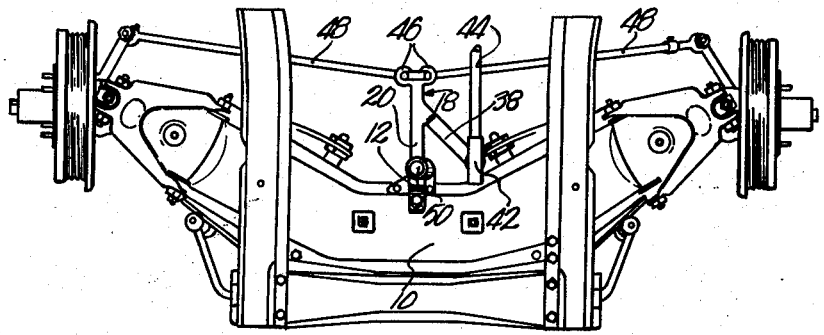
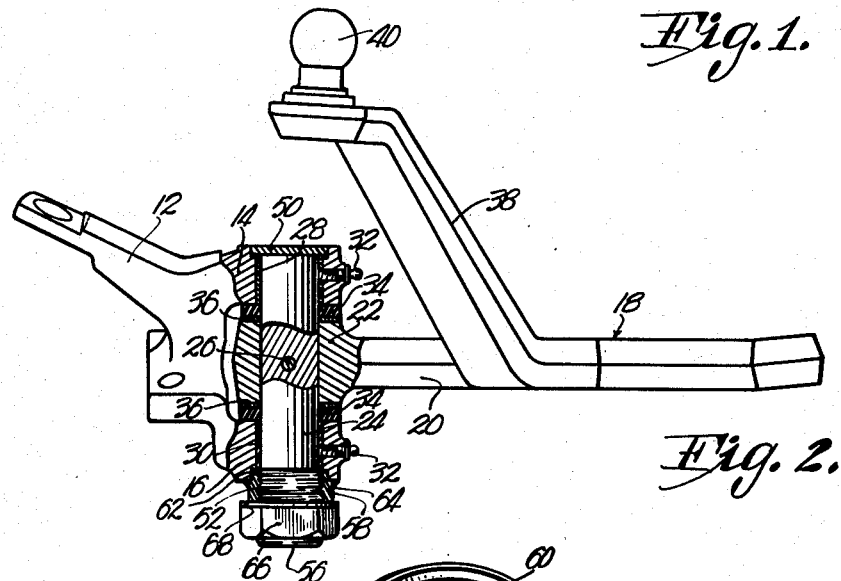
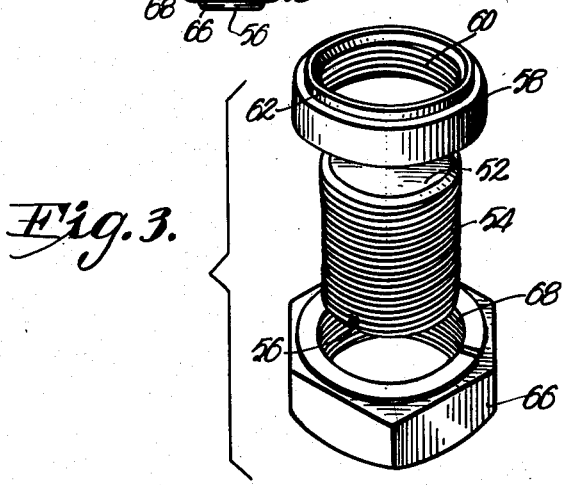
INVENTOR.
Merle E. Balcom
BY
ATTORNEY.

Patented Mar. 24, 1953

2,632,656

UNITED STATES PATENT OFFICE 2,632,656

TAKE-UP DEVICE FOR AUTOMOBILE STEERING IDLERS

Merle E. Balcom, Merriam, Kans.

Application February 19, 1951, Serial No. 211,754

4 Claims. (Cl. 280—95)

This invention relates to automotive equipment and has to do more specifically with improvements in the steering apparatus of automobiles, the primary object being to provide a take-up means for a certain pivot shaft whereby to permit more accurate adjustment and eliminate shim means heretofore provided for such purpose.

In certain makes of present day automobiles there is provided a steering mechanism wherein a bracket supports a combination idler and arm member for rotation through the medium of a pivot shaft. The pivot shaft is secured directly to the idler or arm and rotates within the legs of a bifurcated bracket, there being shims provided to hold the shaft against reciprocable movement on its axis of rotation.

It is most difficult to entirely take up the "play" in such shaft by use of such shims and accordingly, unsatisfactory slack is felt by the driver of the automobile in the steering wheel itself.

It is accordingly the most important object of the present invention to provide take-up means in the nature of a threaded pin that is connected with the bifurcated bracket and gears against one end of the pivot shaft for holding the same against reciprocable movement in lieu of the aforesaid shims.

Another object of this invention is the provision of a take-up device embodying the threaded pin just above mentioned and having associated therewith, a lock ring that bears against the bifurcated bracket and thereby holds the pin against loosening during use of the automobile steering assembly.

Other objects of the present invention include the way in which an internally threaded ring is secured directly to the bifurcated bracket for receiving the take-up pin, and the manner in which a lock washer is provided for holding the locking nut against displacement when the automobile is placed in use.

In the drawing:

Figure 1 is a fragmentary top plan view of the front end of an automobile chassis, illustrating a portion of the steering assembly with which the take-up device forming the subject matter hereof, is associated.

Fig. 2 is a side elevational view of a combination idler and third arm for automobile steering assemblies operably connected with a bifurcated bracket, parts being broken away and in section to reveal details of construction of the take-up device hereof; and Fig. 3 is a specific stretched-out view of the take-up device for automobile steering idlers entirely removed from the steering mechanism.

A portion of the steering mechanism of the present day automobile with which the take-up device hereof is capable of being used, is illustrated in Figs. 1 and 2 of the drawing, and in this connection there is provided a front end frame piece 10 upon which is mounted a bifurcated bracket 12 having a pair of spaced-apart, laterally projecting legs 14 and 16 arranged substantially in relative superimposed relationship.

Bracket 12, which is mounted directly on the framepiece 10, receives a combination steering idler and third arm assembly broadly designated by the numeral 18 and including idler 20 having perforated head 22 on one end thereof that is disposed between the legs 14 and 16 of bracket 12 for swinging movement. The head 22 of idler 20 has a shaft 24 extending therethrough that is rigidly secured to head 22 by a cross pin 26. Shaft 24 rotates on substantially a vertical axis and is received by openings in both legs 14 and 16 that are in turn provided with bushings 28 and 30 respectively. Lubrication is provided for the shaft 24 as the same rotates in the bushings 28 by means of a fitting 32 for each leg 14 and 16 respectively. Accordingly, there is provided a seal 34 and a seal retainer 36 on the innermost face of each leg 14 and 16 respectively. An arm 38 integral with the idler 20 is provided with a ball 40 for receiving socket 42 of a steering connecting rod assembly 44 that in turn couples with the automobile steering column, not shown.

The idler 20 is provided with a pair of perforated heads 46 for pivotally receiving tie rods 48. A small disc-like plug 50 overlies the normally uppermost end of the shaft 24 and is held in place within leg 14 by upsetting the metal from which the plug 50 is formed.

Conventionally, there is provided a plug such as at 50 at the lowermost end of the shaft 24 within the leg 16 but in carrying out the present invention, such plug has been removed and may be discarded. Also, in present practice, the means for holding the shaft 24 against reciprocation on its longitudinal axis constituted the provision of shims (not shown) between the lowermost seal 34 and the uppermost face of the leg 16. It is impossible however, through use of such shim or shims to accurately and positively prevent all such reciprocable movement and even though slight, the disadvantage is exaggerated tremendously in the automobile steering wheel, Further, the shims are difficult to apply, requiring removal entirely of the bracket 12 and thereupon removal of the shaft 24 from the bracket 12 and from the assembly 18. Such shims soon wear, even though virtually all of the slack is removed in applying the same, but as above indicated, it is virtually impossible to force shims of exact thicknesses in place between the lowermost seal 36 and the bracket leg 16.

The take-up device hereof is shown in Fig. 2 and more clearly in Fig. 3 of the drawing and includes an elongated pin 52 that is externally threaded as at 54 throughout substantially its entire length and it is to be preferred that the outside diameter of the pin 54 be substantially the same as that of the shaft 24.

A transverse kerf 56 is provided in one end of the pin 52 for receiving a screw driver or like tool when adjustment is to take place as hereinafter to be made more clear. A ring 58 having internal threads 60 is provided with an annulus 62 of reduced diameter and adapted to be received by the leg 16 at its lowermost end immediately below the bushing 30. Ring 58 is mounted on the legs 16 in any suitable manner such as by welding 64.

A lock nut 66 is threaded on the pin 52 below ring 58 and a lock washer 68 surrounding the pin 52 is interposed between the nut 66 and the ring 58. With the ring 58 rigidly mounted in place on the leg 16, it is seen that it will receive the pin 52 in coaxial relationship to the shaft 24 through use of the kerf 56. The pin 52 may be brought to bear tightly against the lowermost end of the shaft 24 forcing the latter upwardly and holding the same against reciprocation on its longitudinal axis of rotation. Thereupon the nut 66 is mounted on the pin 52 and the lock washer 68 is clamped tightly between nut 66 and the ring 58.

It is clear that through the use of the take-up device shown in Fig. 3 of the drawing, a relatively tight holding action can be imparted to the shaft 24 and since the latter rotates but slightly during use of the automobile steering mechanism, all looseness in the steering wheel can be eliminated and steering of the automobile rendered easy and more pleasant. The frictional sliding interengagement between the lower end of shaft 24 and the upper end of pin 52 is lubricated by means of the fitting 32 in leg 16 and of course, such wear is of no significance since the looseness can be taken up from time to time by merely loosening nut 66 and applying a screw driver or other tool to the pin 52 by means of kerf 56.

The advantages emanating from the use of the take-up device hereof are apparent and while the same may be modified so far as details of construction are concerned, it is desired to be limited only by the spirit of the invention as defined by the scope of the appended claims.

Having thus described the invention, what is claimed as new and desired to be secured by Letters Patent is:

1. For an automobile having a front end framepiece, a bifurcated bracket mounted on said framepiece and provided with an uppermost and a lowermost leg, said legs being spaced-apart and each having an opening therein, a combination steering idler and third arm assembly adapted for operable connection with a pair of tie rods and with a connecting rod for a steering assembly, an idler on said first mentioned assembly having a perforated head between said legs, an elongated shaft extending through the openings of the legs and the perforation of the head, said shaft having a flat lowermost end and being fixed to the head for rotation therewith within said openings on a vertical, longitudinal axis through the shaft, a take-up device comprising an internally-threaded ring secured to said lowermost leg below the shaft; and an elongated, externally-threaded pin within the ring and having a flat uppermost end bearing against said lowermost end of the shaft for holding the head raised out of engagement with the lowermost leg and in engagement with the uppermost leg.

2. A take-up device as set forth in claim 1 wherein said ring has an annulus of reduced diameter inserted in the opening of the lowermost leg, the ring being welded to said lowermost leg.

3. A take-up device as set forth in claim 2 wherein is provided a lock nut on the pin, bearing against the ring for holding the pin against rotation relative to the ring.

4. A take-up device as set forth in claim 3 wherein said pin has a tool-receiving kerf in the lowermost end thereof for adjustment of the pin upon loosening of the lock nut.

MERLE E. BALCOM.

REFERENCES CITED

The following references are of record in the file of this patent:

UNITED STATES PATENTS

| Number | Name | Date |
|---|---|---|
| 1,620,688 | Rehn | Mar. 15, 1927 |
| 1,705,630 | Woolson | Mar. 19, 1929 |
| 2,083,627 | Youngren | June 15, 1937 |
| 2,095,566 | Lundelius et al. | Oct. 12, 1937 |
| 2,153,862 | Cowles | Apr. 11, 1939 |
| 2,274,353 | Ash | Feb. 24, 1942 |

FOREIGN PATENTS

| Number | Country | Date |
|---|---|---|
| 379,555 | France | Nov. 12, 1907 |